US011106960B2

(12) United States Patent
Geissler et al.

(10) Patent No.: US 11,106,960 B2
(45) Date of Patent: Aug. 31, 2021

(54) RFID DEVICE WITH DUAL FREQUENCY INTERROGATION FOR ENHANCED SECURITY AND METHOD OF PREVENTING COUNTERFEITING OF RFID DEVICES

(71) Applicant: Geissler Companies, LLC, Minneapolis, MN (US)

(72) Inventors: Randolph Keith Geissler, Hudson, WI (US); Steven Arthur Lewis, Bloomington, MN (US)

(73) Assignee: Geissler Companies, LLC, Minneapolis, MN (US)

( * ) Notice: Subject to any disclaimer, the term of this patent is extended or adjusted under 35 U.S.C. 154(b) by 0 days.

(21) Appl. No.: 16/621,595

(22) PCT Filed: Jun. 11, 2018

(86) PCT No.: PCT/US2018/036943
§ 371 (c)(1),
(2) Date: Dec. 11, 2019

(87) PCT Pub. No.: WO2018/231721
PCT Pub. Date: Dec. 20, 2018

(65) Prior Publication Data
US 2020/0257952 A1    Aug. 13, 2020

Related U.S. Application Data

(60) Provisional application No. 62/518,462, filed on Jun. 12, 2017.

(51) Int. Cl.
*G06K 19/07*       (2006.01)
*G06K 19/04*       (2006.01)

(52) U.S. Cl.
CPC ....... *G06K 19/0724* (2013.01); *G06K 19/047* (2013.01)

(58) Field of Classification Search
CPC ........ G06K 19/00; G06K 19/04; G06K 19/07; G06K 19/06
(Continued)

(56) References Cited

U.S. PATENT DOCUMENTS 6,021,949 A    2/2000    Boiron
7,619,522 B2   11/2009   Geissler
(Continued)

OTHER PUBLICATIONS

International Search Report and Written Opinion of ISA dated Oct. 24, 2019 in PCT Application No. PCT/US18/36943, 16 pages.

*Primary Examiner* — Edwyn Labaze
(74) *Attorney, Agent, or Firm* — Berg Hill Greenleaf Ruscitti LLP

(57) ABSTRACT

A secure dual frequency RFID device is provided. The secure RFID device includes a standard high frequency RFID transponder and a low-frequency authenticator. When the high-frequency transponder is activated, it generates a command signal to turn on the low-frequency authenticator, which in turn generates its own low frequency coded transponder signal. High and low frequency readers accept the respective transponder signals and system software confirms the identity of a tagged object using both signals. The authenticator may include a MEMs device or an ASIC. An authentication code generator generates a programmed sequence of authentication signals taking advantage of one or more authenticator parameters including capacitance, resistance, and/or RF frequency. Another embodiment includes a gaming piece housing the RFID device. Another embodiment includes a method of determining locations of gaming pieces on a gaming board, while yet another embodiment includes a gaming device with RFID tagged gaming pieces.

20 Claims, 3 Drawing Sheets

(58) Field of Classification Search
USPC .................................. 235/492, 380, 487, 375
See application file for complete search history.

(56) References Cited

U.S. PATENT DOCUMENTS

| | | | |
|---|---|---|---|
| 8,665,094 B2 | 3/2014 | Lee | |
| 2006/0202835 A1 | 9/2006 | Thibault | |
| 2006/0235805 A1 | 10/2006 | Peng et al. | |
| 2007/0050311 A1 | 3/2007 | Mohr et al. | |
| 2007/0197299 A1 | 8/2007 | Miller et al. | |
| 2009/0082106 A1 | 3/2009 | Yang | |
| 2010/0093429 A1* | 4/2010 | Mattice | G07F 17/3232 463/25 |
| 2011/0273273 A1* | 11/2011 | Liu | G06K 19/0724 340/10.1 |
| 2011/0285511 A1 | 11/2011 | Maguire et al. | |
| 2016/0346671 A1* | 12/2016 | Jarchafjian | H04W 4/80 |
| 2017/0105616 A1 | 4/2017 | Lowry et al. | |
| 2019/0221088 A1* | 7/2019 | Yeh | G07F 17/3239 |

\* cited by examiner

RFID DEVICE WITH DUAL FREQUENCY INTERROGATION FOR ENHANCED SECURITY AND METHOD OF PREVENTING COUNTERFEITING OF RFID DEVICES

CROSS REFERENCE TO RELATED APPLICATION

This application is a national stage application under 35 U.S.C. 371 of PCT Application No. PCT/US2018/036943 having an international filing date of Jun. 11, 2018, which designated the United States, which PCT application claimed the benefit of U.S. Application Ser. No. 62/518,462, filed Jun. 12, 2017, both of which are incorporated by reference in their entirety.

FIELD OF THE INVENTION

The invention relates generally to radiofrequency identification devices (RFID) and systems, and more particularly, to RFID devices with enhanced security features to prevent counterfeiting. The invention further relates to RFID devices that have high and low frequency authentications, and methods associated with the devices incorporated within a plurality of objects which are tagged with RFID devices and monitored for security purposes.

BACKGROUND OF THE INVENTION

Radiofrequency identification employs electromagnetic fields to automatically identify objects that incorporate RFID tags. An RFID tag includes electronically stored information in the form of electronic registers that store data that may allow the tag to be uniquely identified among a plurality of other RFID tags. RFID tags are utilized within many different commercial settings. Examples of uses of RFID tags include tags for livestock, RFID tagged pharmaceuticals, RFID tags for component identification of objects within a manufacturing process, and others.

The active tags intermittently transmit an ID signal for authentication. A battery assisted passive tag also has an integral battery power source, but is not activated unless in the presence of an RF signal generated by an RFID reader. A passive tag has no onboard power source and rather, uses the radiofrequency energy transmitted by the reader to power the tag. Further, tags may be read only or read/write. For read-only tags, a pre-assigned serial number and other data may be incorporated in the read-only register(s) of the tags. Read/write tags are those in which object specific data is written into the tag by a user/administrator.

As for the basic structure of an RFID tag, it includes an integrated circuit or "chip" for storing and processing information, modulating and demodulating an RF signal, and collecting power from the incident reader signal. The tag further includes an antenna for receiving an interrogation signal and transmitting an identification signal. Specific tag information is typically stored as nonvolatile memory and incorporates logic for processing transmission and sensor data. The logic can be programmable by a user or preprogrammed.

A RFID reader transmits an encoded radio signal to interrogate the tag. After interrogation, the tag replies with a relatively low power transmission signal that identifies the tag. Tag authentication typically includes a unique serial number and other product related information which may identify, for example, the specific type of product associated with the tag. Since each tag may be assigned a unique serial number, a RFID reader can distinguish between many tags that might be within the range of the RFID reader.

One particular application for RFID tags includes use within the gambling industry to uniquely identify and track gambling tokens. As one can appreciate, counterfeiting of gambling tokens is a problem which casino operators attempt to mitigate; and RFID capabilities make this technology especially advantageous for gambling token tracking and identification.

Despite the ability of RFID technology to uniquely identify one tag among many others used within the same range of an RFID reader, RFID devices are also vulnerable to counterfeiting. RFID tags can be reverse engineered such that a counterfeit tag generates a reply signal to the interrogation signal that copies the serial number of the tag or other identifying data of the tag. Once the counterfeit tag is validated by the RFID reader, the corresponding object to which the tag is attached can be exchanged for value in the particular commercial setting in which the tag is used. In the environment of a gambling casino, counterfeit gambling tokens can be exchanged for cash thus exposing the casino to significant threats of high value theft.

There are a few examples of US patent references that disclose the use of RFID tags within a gambling setting to include use of RFID tags for gambling tokens.

One example of a RFID tag embedded in a casino chip is the U.S. Pat. No. 8,665,094. This reference generally discloses conventional RFID technology in which the RFID tag is operated at a frequency between 20-25 MHz. This reference further discloses that about 20 RFID embedded casino chips can be discriminated from one another by an interrogator even if the chips are in close proximity to one another, such as when the chips are stacked. Another example of a patent reference is the US Patent Application Publication 20170105616 entitled "Chip with Insert Including Electronic microchip". This reference also generally discloses the use of RFID tags used within gaming chips. An earlier example of a US Patent reference also disclosing the use of RFID technology with respect to a gaming chip includes the U.S. Pat. No. 6,021,949 entitled "Gambling Chip with Identification Device".

There are a few examples of US patent references that employ the use of a transponder that can communicate over more than one frequency. One such reference includes the U.S. Pat. No. 7,619,522 entitled "Radio Frequency Animal Tracking System". This reference more particularly discloses a transponder that can communicate over at least two different frequencies so that the real time performance of the transponder can be improved without losing backwards compatibility. The system provides an improved apparatus and method that allows the end user to customize and program identification tags.

Despite the wide range of RFID tags and corresponding computer processing systems associated with the tags, there is still a significant shortcoming with respect to providing enhanced security for prevention of counterfeit tags. Although an RFID tag may have multiple registers which have data written thereon to identify a particular object in many parameters, each of these registers can ultimately be copied with a counterfeit tag because each of these registers can be accessed and decoded with an interrogation signal which is able to repeatedly activate the RFID tag to be counterfeited. In other words, a repeated and incremental analysis of the signals generated by an RFID tag enable a counterfeiter to effectively copy the data written on the tag.

Even in the case of unpublished or hidden registers, the data corresponding to these registers can be copied by repeated activation of a RFID tag.

Therefore, there is a need to provide a RFID tag with enhanced security features which make it much more difficult to counterfeit. Within this general need for increased security, there is also a need to provide enhanced security RFID tags within standard RFID manufacturing processes. There is also a need to provide such tags at a competitive price and within standard RFID manufacturing processes.

SUMMARY OF THE INVENTION

The invention, in one preferred embodiment, includes a RFID device with enhanced security features to prevent counterfeiting. According to this embodiment, a RFID tag has a dual RFID structure including a high frequency RFID transponder and a complementing low-frequency authenticator. According to one aspect of this first embodiment, it can be considered a RFID tag with two transponders, one high-frequency transponder and one low-frequency transponder adopting a different low frequency transmission protocol such one that can be produced from a Micro-Electro-Mechanical System (MEMS) device or an Application Specific Integrated Circuit (ASIC) device. The high-frequency transponder functions similar to a standard high frequency RFID tag, and the low-frequency transponder functions as a different type of transponder that transmits an authentication reply signal as a function of programmable outputs of the MEMS or ASIC devices, such as programmable and adjustable resistances, capacitances, or RF frequencies.

According to another embodiment of the invention, it may be considered a RFID system including the RFID tag having the dual transponders, a high-frequency reader/interrogator, a low-frequency reader/interrogator, and a computer processor that processes interrogation signals and transponder signals to confirm and update the status of objects that have been tagged within the RFID system.

According to another embodiment of the invention, it includes a method of preventing counterfeiting of an object incorporating a RFID tag. The method includes use of the dual transponder structure for each RFID tag in which the low frequency authenticator provides a substantial barrier to counterfeiting. The low frequency authenticator is selectively activated for a short period of time resulting in a low frequency transponder reply signal that is transmitted only when the authenticator is active during that short period of time. When the authenticator is not activated, it will operate at a capacitance that is not readable by a reader/interrogator. For example, if the authenticator operates when activated at low frequency band between about 125-134 KHz, the authenticator can be programmed to operate well below or above this range when not activated. Accordingly, an interrogator could not read the authenticator thus preventing easy signal analysis by a potential counterfeiter. Further, the low-frequency authenticator includes an authentication code generator which results in pre-programmed authentication reply signals to be generated by the low-frequency authenticator that are of a lower frequency than the high-frequency RFID transponder requiring a low frequency interrogator to be used as opposed to a single interrogator. MEMs and ASIC devices are more difficult to copy in terms of their RF reply signals since these devices are more complex with respect to their programmable functions. According to the preferred embodiment of the device of the invention in which the authenticator generates an RF authentication signal as a function of capacitance, resistance, or frequency, MEMs and ASIC devices can be programmed to generate the authentication signals that are difficult to mimic because of the wide range of functions that can be used to generate signals of different protocols.

As used herein, a "MEMS" device is defined herein as adopting its plain general meaning.

More specifically, a MEMS device can be described as a miniaturized group of mechanical and electromechanical elements made using micro-fabrication techniques. A MEMS device typically has four groups of functional elements including miniaturized structures, sensors, actuators, and microelectronics. The sensors and actuators can be categorized as transducers that convert energy from one form to another. In the present invention, this transducer function is exhibited in the form of an electrical signal that is converted to a low-frequency RF transponder signal.

As used herein, an "ASIC" device is also defined herein as adopting its plain general meaning. More specifically, an ASIC device can be described as an integrated circuit that is specifically customized for a particular use as opposed to a general-purpose integrated circuit. An ASIC device according to the present invention may also include one which can adopt multiple different types of memory blocks and functionality that makes the ASIC device a complete unitary microprocessor.

As understood with respect to RFID systems, a digitally modulated transponder signal is a stream of distinct symbols which are demodulated by the reader or interrogator and then processed by a computer of the RFID system to determine the object which is tagged. The modulated transponder signal may include not only digital information corresponding to the unique serial number of the tag as applied to a known object, but additional data transmitted by the RFID tag corresponding to unpublished or "hidden" data registers unique to the particular tag. While transmission of both serial number data and additional unpublished data makes counterfeiting more difficult, use of the low frequency authenticator of the invention substantially multiplies difficulty in mimicking the unique transponder signals transmitted by the authenticator.

According to one aspect of the RFID device of the invention, once the high-frequency tag is activated, it sends a command signal to the authenticator to turn on for a very short time.

Within the authenticator, it includes an authentication code generator which comprises preprogrammed logic to generate authentication codes as a function of a modifiable parameter of the device, such as transponder signal having a variable resistance, capacitance, and/or frequency. RFID system software has keys to decode the coded authentication signals to confirm identity of the object. Because the authenticator makes use of an authentication code generator which can generate a vast number of different transponder signals, it is much more difficult for a counterfeiter to determine acceptable ranges and sequences of the digitally modulated signals as compared to a standard high frequency tag architecture in which the same groups of digitally modulated signals are transmitted.

In operation, the high and low frequency interrogators may be incorporated within a chip/token authentication device which could be conveniently located at a cashier's station within a casino. Prior to a player being able to cash out, the presented chips would be authenticated by the device to confirm there were no counterfeits. If no counterfeits were present, the player would be paid in full. If there were any non-authenticated chips present, this would alert the casino staff. Appropriate remedial action could then be taken.

According to another aspect of the invention, it is contemplated that both the high and low frequency interrogators are themselves programmable in that the particular interrogation protocol could be changed in the event a counterfeiter was able to obtain access to system software. In this regard, the RFID devices could be pre-programmed as necessary to be responsive to changes in the interrogation fields employed.

According to another aspect of the invention, use of a MEMS magnetometer device within each chip/token could be used to determine where chips were located on a gaming table. One type of gaming table that is relatively complex in terms of the placement of chips is a roulette table. A player is able to place betting chips at a multitude of locations on the gaming board to make bets on different combinations of numbers. For example, a player could make a "straight" bet on a single number, a "split" bet that consists of two vertically or horizontally adjacent numbers, a "street" bet that consists of three consecutive numbers in a horizontal line, or a number of other known betting combinations. With each of these betting combinations, the chips must be precisely spaced on the gaming board. The croupier will assist the players to confirm that the chips are properly placed on the gaming board prior to spinning the roulette wheel. However, for various reasons, chips may not be precisely placed and there could be a dispute regarding the particular placement of the chips to be wagered on a particular spin.

According to the invention, the MEMS magnetometer sensor devices can be selectively activated by use of a plurality of very small electromagnetic coils that are placed at specific locations on the gaming board and are selectively energized. If a chip is placed within a predetermined proximity of the coil, the MEMS magnetometer sensor device will be activated which will enable recordation of the precise location of the chip at that time. More specifically, when the electromagnets are energized, the magnetometers for each chip operate to determine position by, for example, triangulation. The magnetometers are vector type magnetometers capable of discriminating three directional or axis magnetic fields. Triangulation can be achieved by three or more magnetometer signal cycles that result in rapid and accurate positioning data. Also according to the invention, it is contemplated that determining chip positioning on the gaming board could be achieved by use of electromagnets in the chips and a plurality of MEMS magnetometer sensor devices placed at specific locations on the gaming board. In this alternate embodiment, each magnetized chip location is again determined by a triangulation sequence in which chip locations are rapidly sensed and recorded.

Knowing the precise location and time for each chip played enables a casino to confirm whether there was a correct payout for the particular spin. According to the invention, the use of chip accountability according to this method is referred to hereinafter as chip "validation".

One design goal for incorporation of the electromagnetic coils is to incorporate as few and as relatively weak electromagnets as possible to accurately determine chip locations. Of course, the higher number of electromagnetics used will contribute to greater accuracy, but increases the overall cost of adopting chip validation.

As one should appreciate, particularly for a game like roulette, the close spacing between chips and the number of chips used on a gaming board such as roulette makes use of RF antennae very difficult to accurately determine the precise chip locations. With the use of a MEMS magnetometer device as a sensor and an embedded power source placed at predetermined locations on a gaming board, this solution greatly simplifies the ability to precisely track the chips used on a gaming table.

Another benefit of chip validation is the ability to record late bet placement or past posting. One well-known form of cheating on a roulette table is to temporarily distract the croupier while a player executes the late bet by moving chips after the croupier has waived off any further betting for the spin. In this scenario, one player will distract the croupier while another player moves chips out of the sight of the croupier during the distraction. By use of recording of timing between the instant when the croupier waves off further bets as compared to the location of each of the chips at that instant of time, any discrepancies in past posting can be easily resolved with chip validation coupled with a video time stamp as to when the croupier waved off further betting. Understanding that there is a certain amount of reaction time between when a player will cease betting as compared to when the croupier waves off, this method of the invention allows recorded proof as to clearly obvious past posting actions to include a precise recordation of the exact number and value of chips involved in the past posting.

Another advantage of chip validation is to further determine whether there are potentially counterfeit chips being played on the table prior to a player attempting to cash out. With a correct count and location of each chip, the presence of any additional chips on the table can be assumed to be counterfeit, or can be assumed to be non-operable or defective chips. In conjunction with the overhead cameras used in casinos, a fairly simple visual count can be conducted if there is a concern that counterfeit chips were being played for particular gaming table. For example, assuming for a particular roulette spin, only four $100 chips were validated; however afterwards, it was found that there were ten $100 chips played on that particular spin. The cameras would be able to immediately identify such a discrepancy. Further, when the chips are tendered for cashing at the cashier's station, the counterfeit chips would also be identified at that time. The particular person(s) who were in possession of the chips during two separate events may further identify relevant suspects.

According to another embodiment of the invention, if a MEMs device incorporates use of a magnetometer, in lieu of the electromagnetic coils, a plurality of magnets could be used to activate the MEMS devices for each corresponding chip.

A similar factual scenario can be described for other casino games such as blackjack. In blackjack, a betting circle is present where a player makes a bet. During the course of a game, a player may split hands and/or may double down which results in additional chips being placed on the table. If there arose a discrepancy as to the amount of various bets on the table as well as to how the bets should be applied to various blackjack hands, the strategic positioning of small electromagnetic coils at specific locations on the blackjack table can assist for determining chip accountability. Accordingly, chip validation in this scenario also is a valuable tool for recording exactly the actions taking place on the gaming board apart from relying solely upon overhead video.

Considering the above features and characteristics of the invention, in one aspect, it may be considered an RFID device comprising: a high frequency RFID transponder; a low-frequency authenticator having a RF transponder function that utilizes a different RF transmission protocol as compared to a RF transmission protocol of said high frequency RFID transponder; and wherein both said high frequency and low frequency authenticator are interrogated by an RF reader, and corresponding data retrieved from both is used to determine the identity of an object having the RFID device secured thereto.

According to another aspect of the invention, it may be considered a method to prevent counterfeiting of an object having an RFID device secured thereto, said method comprising: providing a RFID device a high frequency RFID transponder, and a low-frequency authenticator having a RF transponder function that utilizes a different RF transmission protocol as compared to a RF transmission protocol of said high frequency RFID transponder; interrogating the high frequency RFID transponder and the low-frequency authenticator with corresponding high and low frequency interrogation fields; retrieving data from both the high frequency RFID transponder and low-frequency authenticator; and determining the identity of the object considering the retrieved data from both.

According to another aspect of the invention, it may be considered a gaming piece, comprising: an outer shell; an RFID device comprising a high frequency RFID transponder mounted in the outer shell; a low-frequency authenticator mounted in the outer shell, said low-frequency authenticator having a RF transponder function that utilizes a different RF transmission protocol as compared to a RF transmission protocol of said high frequency RFID transponder; and wherein both said high frequency and low frequency authenticator are interrogated by an RF reader, and corresponding data retrieved from both is used to determine the identity of the gaming device. The gaming piece of this aspect may further include an element for determining locations of the gaming piece on a gaming board. This element may be a MEMS vector magnetometer sensor.

According to a sub-combination of the aforementioned gaming piece, the gaming piece may only include the MEMS vector magnetometer sensor without the RFID device.

According to yet another aspect of the invention, it may be considered a gaming system, comprising: a gaming board having a board layout including a plurality of predetermined areas denoting locations where bets can be placed; a plurality of electromagnets mounted adjacent said gaming board and aligned with said predetermined areas, said electromagnets being selectively powered to generate corresponding electromagnetic fields; a plurality of gaming pieces each with a corresponding vector magnetometer sensor mounted therein; and wherein said plurality of electromagnets being selectively spaced from one another to facilitate identification of each gaming piece placed on said gaming board.

According to yet another aspect of the invention, it may be considered a method of determining locations of gaming pieces on a gaming board, comprising: providing a gaming board having a board layout including a plurality of predetermined areas denoting locations where bets can be placed; positioning a plurality of electromagnets mounted adjacent said gaming board and aligned with said predetermined areas, said electromagnets being selectively powered to generate corresponding electromagnetic fields; placing a plurality of gaming pieces on said gaming board, each gaming piece having a corresponding RFID device mounted therein, wherein said plurality of electromagnets are selectively spaced from one another on said gaming board; energizing said electromagnets; and selectively energizing selected ones of said gaming pieces such that each energized gaming piece is located on said board as determined by said corresponding RFID device.

These and other features and advantages of the invention will become apparent from a review of the following detailed description taken in conjunction with the drawings.

DETAILED DESCRIPTION

In a preferred embodiment of the invention, it includes a RFID device with enhanced security features to prevent counterfeiting. The RFID device has a dual RFID structure including a high frequency RFID transponder and a complementing low-frequency authenticator. The low-frequency authenticator has an RF transponder function that utilizes a different low frequency RF transmission protocol, such as one produced from a MEMs device or an ASIC device in combination with RFID architecture.

Figure 1:
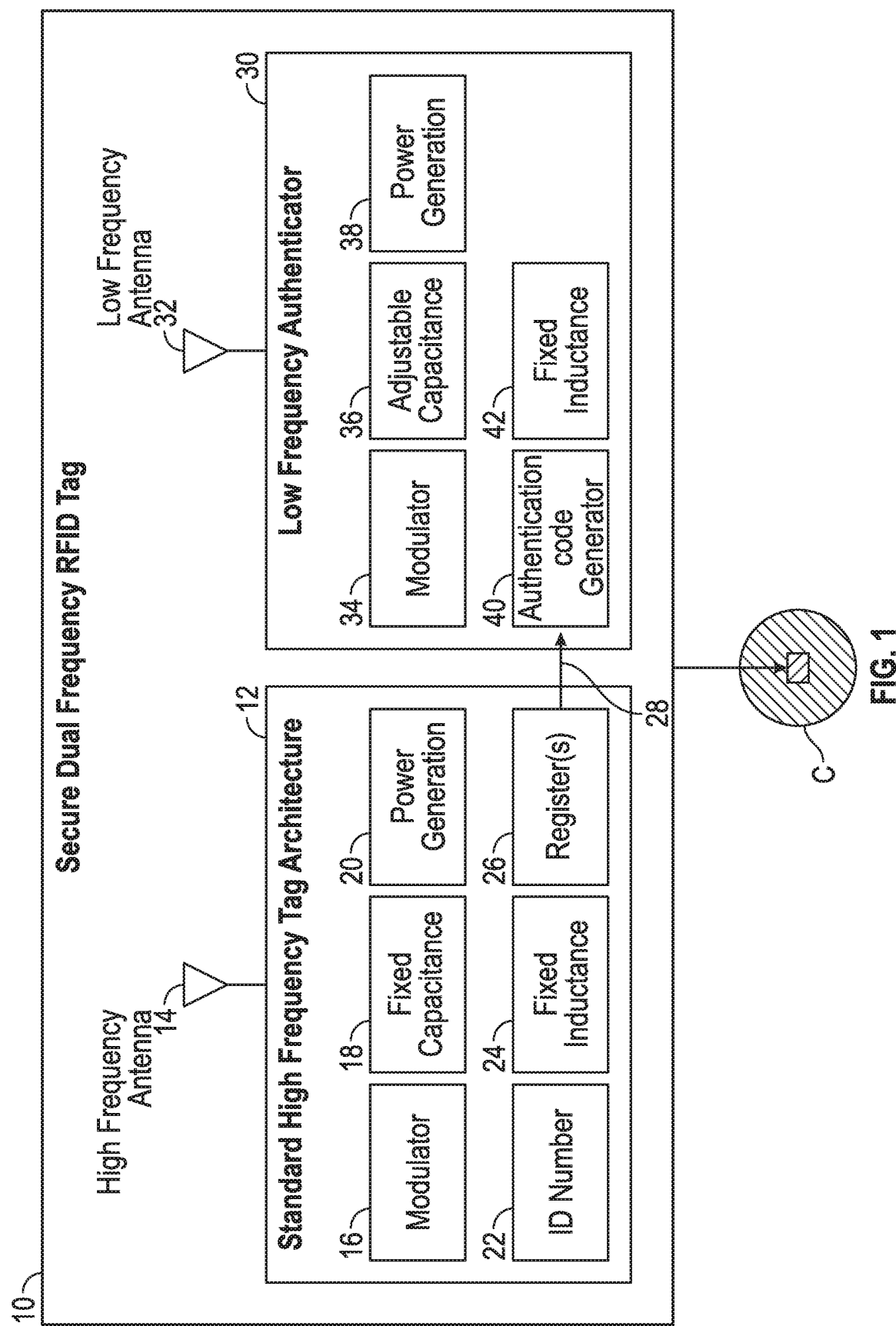
FIG. 1 is a schematic diagram of an RFID device of the invention including a high-frequency RFID tag and a low frequency authenticator.

Referring to FIG. 1, the RFID device 10 of the invention is illustrated in a preferred embodiment. In one application, the device 10 may be incorporated within an object such as a gambling chip C. The gaming chip has an outer shell or cover which protects the transponder 12 and authenticator 30. The device 10 may also be referred to herein as a secure dual frequency RFID tag, or "secure RFID tag". The secure RFID tag has two primary components, namely, a high frequency RFID transponder 12 that incorporates standard architecture and a low frequency authenticator 30. The gaming chip has an outer shell or cover which protects the transponder 12 and authenticator 30. The gaming chip C may also have one or more protective layers to providing cushioning for the electronic components. The transponder 12 has a number of components/functions illustrated in the schematic diagram, these components/functions including: an antenna 14, a modulator 16, a fixed capacitance 18, a power generation element 20, a unique serial number 22 within a data register, a fixed inductance 24, and one or more additional data registers 26. The authenticator 30 is also illustrated with a number of components/functions including: an antenna 32, a modulator 34, an adjustable capacitance 36, a power generation element 38, an authentication code generator 40, and a fixed inductance 42.

The RFID transponder 12 functions according to existing high-frequency RFID protocol.

A high frequency RF interrogation signal (not shown) is received by the antenna 14. The interrogation signal is used as a power source within the power generation element 20 to selectively power the transponder 12. The transponder 12 operates under a fixed capacitance 18 and a fixed inductance 24, which is common for existing RFID transponders. The transponder 12 is assigned a unique serial or ID number 22, and this unique number is converted within the modulator 16 to a digitally modulated RF signal that is transmitted back to the reader/interrogator.

When the RFID transponder 12 is powered, it provides a command signal through one of the additional registers 26, illustrated as electrical command 28, to activate the authentication code generator 40 of the authenticator 30. This signal 28 can be carried as by a wired connection between the register 26 and the authentication code generator 40.

Overall power for the authenticator 30 may be provided by an electrical power connection (not shown) from the RFID transponder 12, a low-frequency interrogation signal transmitted by a low frequency reader/interrogator (not shown), or the high-frequency interrogation signal.

In the embodiment of FIG. 1, the authenticator 30 is operated at a fixed inductance 42; however, it is operated at an adjustable capacitance 36, and this adjustable capacitance is the variable which allows a digitally modulated RF signal to carry selected authentication codes created by logic within the authentication code generator. In other words, the authentication codes employ adjustable capacitance as one variable that allows a vast number of different modulated signals to be transmitted as opposed to a finite number of modulated signals available to be transmitted in a standard high frequency RFID architecture. A low-frequency reader could interrogate the low-frequency authenticator using the LF RFID frequency band (125 KHz to 134 KHz). As mentioned, if the authenticator operates when activated at this range, the authenticator can be programmed to operate well below or above this range when not activated. Accordingly, an interrogator could not read the authenticator thus adding another security feature preventing extended periods of signal analysis by a potential counterfeiter.

According to a method of the invention to prevent counterfeiting, the high-frequency transponder is first interrogated by a high-frequency RF field. The RFID transponder transmits a modulated RF reply signal containing the unique serial number and any other identifying data associated with the RFID transponder. Simultaneously, the high-frequency transponder sends a command signal to activate the low-frequency authenticator for a short period of time. Based upon pre-programmed conditions, the low-frequency authenticator through its authentication code generator provides a coded transponder signal in which the signal includes a variable whose value or magnitude is responsive to the particular logic associated with the authentication code generator. The variables contemplated within the low-frequency authenticator include capacitance, resistance, and/or frequency. The low-frequency authenticator transmits a low-frequency digital modulated RF reply signal corresponding to the particular code generated for that particular activation of the low-frequency authenticator. A high-frequency reader and low-frequency reader receive the respective modulated high low-frequency signals from the device. These signals in combination are evaluated by a computer processor of an RFID system to confirm and authenticate the secure RFID tag.

The low-frequency authenticator can be activated for less than 5 ms to generate its low-frequency transponder signal therefore making a duplicate of the authenticator very difficult since the very short pulse activation does not allow convenient signal evaluation as compared to standard RFID tags in which activation takes place over a much greater time.

In another preferred embodiment, the low frequency authenticator can be a low frequency RFID device. Although duplication of the low-frequency RFID device may be easier to accomplish as compared to a MEMs or ASIC, certain security features are still present which includes short pulse activation of the authenticator and the capability to send the command signal 28 to additional sets of registers (not shown) in the authenticator. The additional sets of registers require significant additional reverse engineering work to determine what additional signals are being produced.

In the event an RFID system was compromised by unauthorized access from a counterfeiter, the high and low frequency interrogators are programmable so the particular interrogation protocol could be changed to remedy the situation. The RFID devices could be pre-programmed as necessary to be responsive to changes in the interrogation fields employed.

As evident with the foregoing description, the invention is one which may be provided in multiple applications to make counterfeiting much more difficult. This object of the invention can be accomplished without significantly degrading how quickly a RFID system can identify and verify a single RFID tag out of many within the antenna range. Further, a secure RFID tag incorporating the authenticator can be manufactured within reasonable costs. With respect to a MEMs device or an ASIC, these types of devices are much more difficult to copy since each has significant functional capabilities enabling them to generate a vast number of digitally modulated RF authentication signals within an onboard processor.

Figure 2:
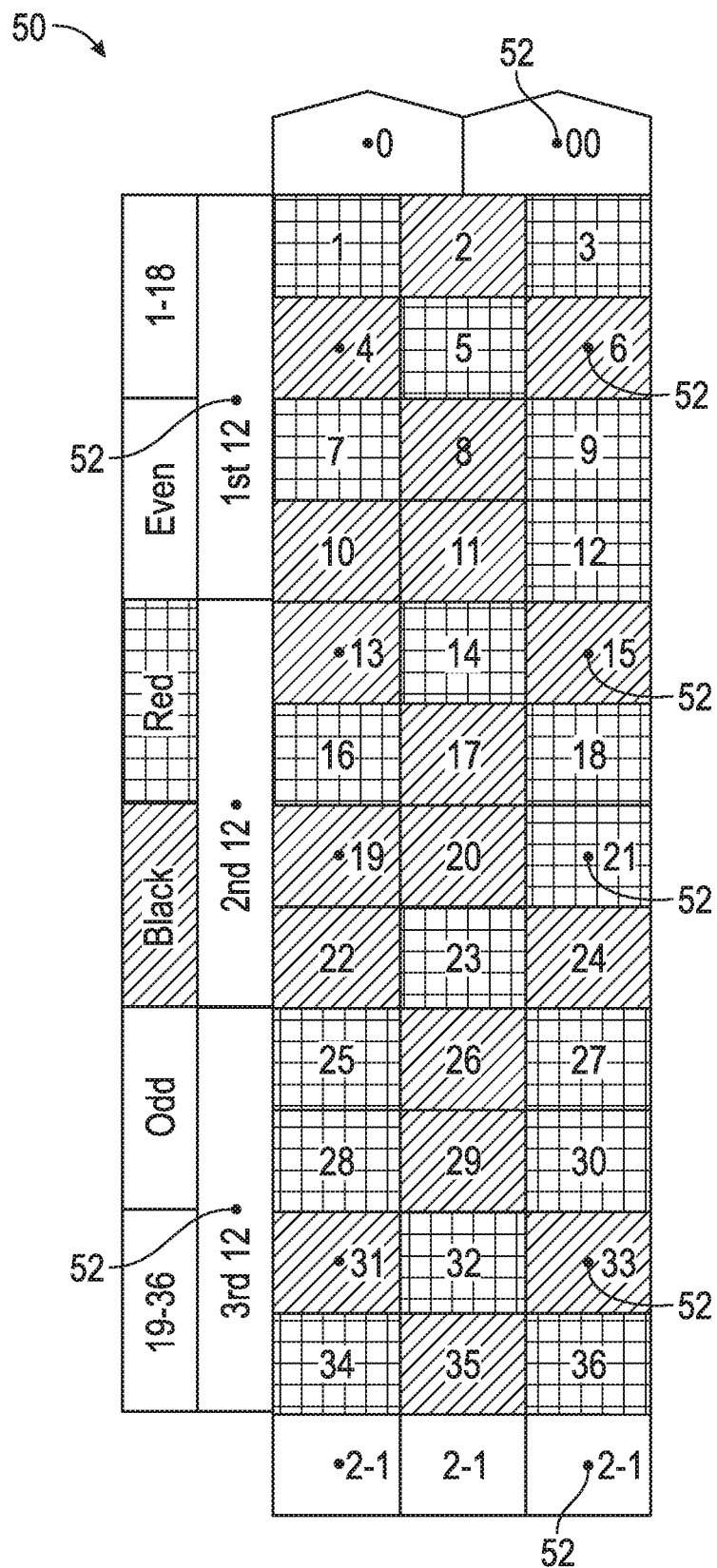
FIG. 2 is a plan view of an example gaming board with a plurality of electromagnetic coils placed at pre-configured known locations on the gaming board in which RFID tagged gaming chips or tokens can each be interrogated and authenticated despite very close spacing of many chips/token on the gaming board, and therefore the precise location of each chip can be determined during game play.

Referring to FIG. 2, a gaming board is illustrated, namely, a roulette board 50 associated with betting on a roulette wheel (not shown). The roulette board 50 comprises a group of partitioned areas with numbers, combination of numbers, and other indicia associated with a roulette wheel. The pockets of a roulette wheel are numbered from 0 to 36. In some roulette wheels, there is also a double zero (00). For the group of numbers from 1 to 10 and 19 to 28, odd numbers are red and even numbers are black. For the group of numbers from 11 to 18 and 29 to 36, odd numbers are black and even numbers are red. Keeping this convention in mind, the roulette board is also divided so that a player may make a number of different betting combinations on groups of numbers and colors. Accordingly, the roulette board 50 illustrated is laid out in a typical manner in which there are three columns of numbers, twelve rows of numbers, and other betting combinations. According to the invention, a plurality of energy sources in the form of the very small electromagnets 52, are dispersed about the surface of the board. In one preferred embodiment, the electromagnets 52 are mounted beneath the playing surface so that they are hidden from view and do not interfere with placement of chips on the board. The specific arrangement of the electromagnets is exemplary. Depending upon the specific location of each chip placed upon the gaming board, each chip will be selectively activated by one or more electromagnets, and thereby the specific location of the gaming chip can be determined and recorded.

More specifically, if a chip is placed within a predetermined proximity of an energized electromagnetic coil, the MEMS vector magnetometer within the chip will be activated which will enable recordation of the precise location of the chip at that time. As mentioned, when the electromagnets are energized, the vector magnetometers for each chip operate to determine position by triangulation. Triangulation can be achieved by successive magnetometer signal cycles that result in rapid and accurate positioning data. As also mentioned, determining chip positioning can alternatively be achieved by use of electromagnets in the chips and a plurality of MEMS magnetometer sensor devices placed at specific locations on the gaming board.

It should be understood that use of a MEMS vector magnetometer sensor can be viewed as an additional capability for a gaming piece that incorporates an RFID device. Accordingly, the construction of a gaming chip may include both the RFID device and a separate or dedicated MEMS vector magnetometer sensor.

Once the chips are activated, their location signals can be recorded to determine their exact location on the board and the time in which they were found at a particular location. The recordation of the position data at precisely known times enables a complete recall of any bet that has occurred on the roulette table to include the identity of each chip played. As mentioned, chip location and time verification can be used to evaluate past posting as well as to confirm proper payouts associated with potential betting disputes.

Further, the time and position data can be used for training of gaming personnel. A number of factors can be evaluated to include typical actions of players after the croupier has waived off further bets and how to establish guidelines for determining when past posting occurs.

It should be understood that the particular arrangement of the electromagnets 52 can be changed to accommodate the desired amount of power to be provided and the specific incremental areas in which power is to be provided for discrimination of chip location on the board.

Figure 3:
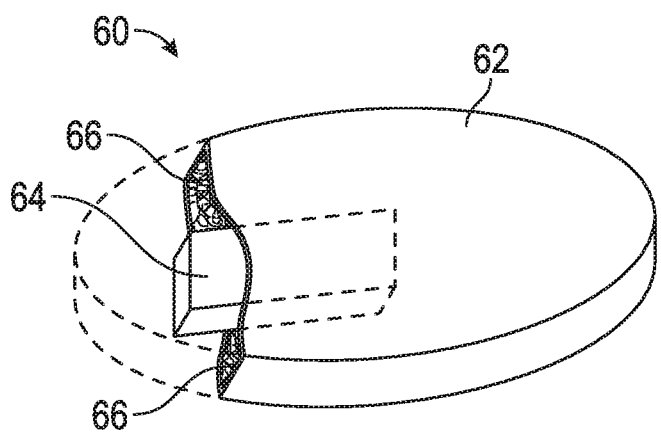
FIG. 3 is a fragmentary cross sectional view of an example chip or token incorporating the RFID device and optionally incorporating a vector magnetometer device therein.

FIG. 3 is a simplified cross-sectional view of a sample gaming chip, token, or piece 60, first mentioned in FIG. 1 as the gambling chip C. The chip 60 includes an outer shell 62 that houses the RFID device 64. The chip 60 may include one or more layers of filler or padding material 66 to protect the RFID device 64 from damage associated with shock from the chip being routinely tossed and dropped. The filler 66 however should not interfere with low power RF signals that are used to activate the RF device 64. As mentioned, the RFID device 64 may further house a MEMS magnetometer sensor (not shown) for purposes of determining chip position on a game board. The chip 60 is shown with a conventional disk shape; however, the particular shape and size of the token can be modified for use within specific gambling or other applications.

The invention is described above with respect to multiple embodiments. It should be understood however that the invention is not strictly limited to such preferred embodiments and scope of the invention should be considered commensurate with the scope of the claims appended hereto.

What is claimed is:

1. A RFID device comprising:
a high frequency RFID transponder;
a low-frequency authenticator having a RF transponder function that utilizes a different RF transmission protocol as compared to a RF transmission protocol of said high frequency RFID transponder;
wherein both said high frequency RFID transponder and said low frequency authenticator are interrogated by an RF reader, and corresponding data retrieved from both is used to determine an identity of an object having the RFID device secured thereto;
wherein said low-frequency authenticator includes an antenna, a modulator, a power generation element, and an authentication code generator; and
wherein said high frequency RFID transponder generates a command to activate said low-frequency authenticator.

2. The device, as claimed in claim 1, wherein the device is embedded within a gambling chip.

3. The device, as claimed in claim 1, wherein said high frequency RFID transponder includes an antenna, a modulator, a power generation element, and a plurality of data registers.

4. The device, as claimed in claim 1, wherein:
said authentication code generator generates a code containing a pre-programmed variable, said variable including at least one of a variable capacitance, inductance, or frequency.

5. A method to prevent counterfeiting of an object having an RFID device secured thereto, said method comprising:
providing a RFID device a high frequency RFID transponder; and a low-frequency authenticator having a RF transponder function that utilizes a different RF transmission protocol as compared to a RF transmission protocol of said high frequency RFID transponder;
wherein said low-frequency authenticator includes an antenna, a modulator, a power generation element, and an authentication code generator; and wherein said high frequency RFID transponder generates a command to activate said low-frequency authenticator;
interrogating the high frequency RFID transponder and the low-frequency authenticator with corresponding high and low frequency interrogation fields;
retrieving data from both the high frequency RFID transponder and the low-frequency authenticator; and
determining the identity of the object considering the retrieved data from both.

6. The method, as claimed in claim 5, further including:
generating a command by said high frequency RFID transponder to activate said low-frequency authenticator within a desired low frequency band.

7. The method, as claimed in claim 6, further including:
operating said low-frequency authenticator at a variable that is out of range of said desired low frequency band when said low-frequency authenticator is not activated.

8. The method, as claimed in claim 7, wherein:
said variable includes at least one of a selected capacitance, resistance, and/or frequency.

9. A gaming piece, comprising:
an outer shell;
a high frequency RFID transponder mounted in the outer shell;
a low-frequency authenticator mounted in the outer shell, said low-frequency authenticator having a RF transponder function that utilizes a different RF transmission protocol as compared to a RF transmission protocol of said high frequency RFID transponder; and
wherein both said high frequency RFID transponder and said low frequency authenticator are interrogated by an RF reader, and corresponding data retrieved from both is used to determine the identity of the gaming device;
wherein said low-frequency authenticator includes an antenna, a modulator, a power generation element, and an authentication code generator; and
wherein said high frequency RFID transponder generates a command to activate said low-frequency authenticator.

10. The gaming piece, as claimed in claim 9, wherein the piece is a gambling chip.

11. The gaming piece, as claimed in claim 9, wherein said high frequency RFID transponder includes an antenna, a modulator, a power generation element, and a plurality of data registers.

12. The gaming piece, as claimed in claim 9, wherein:
said authentication code generator generates a code containing a pre-programmed variable, said variable including at least one of a variable capacitance, inductance, or frequency.

13. The gaming piece, as claimed in claim 9, further comprising:
a MEMS magnetometer sensor mounted within said outer shell.

14. A gaming system, comprising:
a gaming board having a board layout including a plurality of predetermined areas denoting locations where bets can be placed;
a plurality of electromagnets mounted adjacent said gaming board and aligned with said predetermined areas, said electromagnets being selectively powered to generate corresponding electromagnetic fields;
a plurality of gaming pieces each with a corresponding RFID device and a vector magnetometer sensor mounted therein; and
wherein said plurality of electromagnets being selectively spaced from one another to facilitate identification of each gaming piece placed on said gaming board.

15. The gaming system, as claimed in claim 14, wherein:
said gaming board is a roulette board.

16. A method of determining locations of gaming pieces on a gaming board, comprising:
providing a gaming board having a board layout including a plurality of predetermined areas denoting locations where bets can be placed;
positioning a plurality of electromagnets mounted adjacent said gaming board and aligned with said predetermined areas, said electromagnets being selectively powered to generate corresponding electromagnetic fields;
placing a plurality of gaming pieces on said gaming board, each gaming piece having a corresponding vector magnetometer sensor mounted therein, wherein said plurality of electromagnets are selectively spaced from one another on said gaming board;
energizing said electromagnets; and
selectively energizing selected ones of said gaming pieces such that a location of each energized gaming piece is determined on said board by said corresponding vector magnetometer sensor device.

17. The method, as claimed in claim 16, wherein:
said vector magnetometer sensor is a MEMS device.

18. The method, as claimed in claim 16, further including:
providing each of the gaming pieces with an RFID device mounted therein.

19. A RFID device comprising:
a high frequency RFID transponder;
a low-frequency authenticator having a RF transponder function that utilizes a different RF transmission protocol as compared to a RF transmission protocol of said high frequency RFID transponder;
wherein both said high frequency RFID transponder and said low frequency authenticator are interrogated by an RF reader, and corresponding data retrieved from both is used to determine an identity of an object having the RFID device secured thereto;
wherein said low-frequency authenticator includes a modulator and an authentication code generator; and
wherein said high frequency RFID transponder generates a command to activate said low-frequency authenticator.

20. The device, as claimed in claim 19, wherein:
said authentication code generator generates a code containing a pre-programmed variable, said variable including at least one of a variable capacitance, inductance, or frequency.

* * * * *